United States Patent
Fromson et al.

[11] Patent Number: 6,127,050
[45] Date of Patent: Oct. 3, 2000

[54] ARCHIVAL IMAGING MEDIUM AND METHOD THEREFOR

[76] Inventors: Howard A. Fromson, 49 Main St., Stonington, Conn. 06378; William J. Rozell, 608 Bolton Rd., Vernon, Conn. 06066

[21] Appl. No.: 09/079,734

[22] Filed: May 15, 1998

Related U.S. Application Data

[63] Continuation-in-part of application No. 09/038,672, Mar. 11, 1998, abandoned, which is a continuation-in-part of application No. 09/019,830, Feb. 6, 1998, abandoned.
[60] Provisional application No. 60/047,446, May 22, 1997.
[51] Int. Cl.⁷ .............................. G11B 7/24; G11C 13/04; B32B 15/00; B42D 15/10
[52] U.S. Cl. ......................... 428/645; 148/512; 148/525; 148/903; 205/139; 205/153; 205/206; 205/224; 219/121.66; 283/88; 283/89; 283/94; 283/109; 428/143; 428/148; 428/472.2; 428/648; 428/659; 428/687; 430/10; 430/270.11; 430/945
[58] Field of Search .............................. 205/50, 139, 153, 205/206, 214, 224; 283/88, 89, 91, 94, 109, 111; 428/469, 472.2, 659, 687, 143, 148, 645, 648; 430/9, 10, 270.11, 495.1, 945; 148/512, 525, 903; 219/121.65, 121.66

[56] References Cited

U.S. PATENT DOCUMENTS

| | | | |
|---|---|---|---|
| 3,640,009 | 2/1972 | Komiyama | 283/88 |
| 3,865,700 | 2/1975 | Fromson | 205/139 |
| 4,049,506 | 9/1977 | Gilding | 204/38 R |
| 4,183,788 | 1/1980 | Fromson et al. | 430/278.1 |
| 4,222,662 | 9/1980 | Kruegle | 355/40 |
| 4,343,533 | 8/1982 | Currin et al. | 350/288 |
| 4,363,677 | 12/1982 | Ichiyama et al. | 148/111 |
| 4,564,736 | 1/1986 | Jones et al. | 219/121 L |
| 4,596,189 | 6/1986 | Halpern et al. | 101/458 |
| 4,652,722 | 3/1987 | Stone et al. | 219/121 LS |
| 5,232,527 | 8/1993 | Vernhet et al. | 156/67 |
| 5,339,737 | 8/1994 | Lewis et al. | 101/454 |
| 5,465,780 | 11/1995 | Munther et al. | 164/516 |
| 5,478,695 | 12/1995 | Leenders | 430/259 |
| 5,575,507 | 11/1996 | Yamauchi et al. | 283/86 |
| 5,845,543 | 12/1998 | Yamanaka | 74/594.1 |

OTHER PUBLICATIONS

H. Silman et al. Protective and Decorative Coating for Metals, Finishing Publications Ltd., Teddington, Middlesex, England, pp. 456–463, 1978, month of publication not available.

*Primary Examiner*—Kathryn Gorgos
*Assistant Examiner*—William T. Leader
*Attorney, Agent, or Firm*—Fulbright & Jaworski, LLP

[57] ABSTRACT

An archival medium, such as a compact disc, is made of a metal such as aluminum which is mechanically gained with particulate material under conditions that embed particulate material into the surface of the medium and visibly imageable by selective exposure to infrared laser radiation. A mechanically grained aluminum medium can also be anodically oxidized under conditions that do not impair the ability of the substrate to be laser imaged. The archival medium can be coated with opaque and transparent polymer coatings before or after imaging for security and/or protection. The coating can be a laser ablatable coating to provide a tamper-proof medium.

22 Claims, 1 Drawing Sheet

1 Pass SEM (100,000X)

2 Pass SEM (100,000X)

3 Pass SEM (100,000X)

ARCHIVAL IMAGING MEDIUM AND METHOD THEREFOR

This is a continuation-in-part of application Ser. No. 09/038,672 filed Mar. 11, 1998, now abandoned, which is a continuation-in-part of Ser. No. 09/019,830 filed Feb. 6, 1998, now abandoned, which is a continuation-in-part of provisional application Ser. No. 60/047,446 filed May 22, 1997, all of which are hereby incorporated by reference.

This invention relates to archival imaging on metal substrates such as aluminum and method for producing same. The invention can be used for security or credit cards incorporating such substrate.

There has long been a need for permanent storage of both analog and digital data. Electronic data storage on tapes and discs is subject to deterioration over time and cannot be depended on for long-term archival storage.

The present invention provides a laser imageable storage medium that is completely inorganic, does not corrode, is abrasion resistant, cannot easily be altered once imaged, and is unaffected by either heat up to 500° F. or ultraviolet light.

SUMMARY OF THE INVENTION

According to the present invention, a metal substrate is treated such that the surface is capable of being visibly imaged by selective writing with an infrared laser. A preferred treatment for this purpose is rotary brush graining. The phrase "rotary brush graining" is intended to refer to any process using axially rotating brushes that tangentially contact a surface to be grained in the presence of a slurry containing particulate material such as alumina, silica and the like. The phrase also includes equivalent processes that produce the same result.

Rotary brush graining allows the substrate to absorb incident infrared laser radiation and thus create an image in the substrate. The preferred metal substrate is aluminum. In an alternative embodiment, the aluminum may be anodized after rotary brush raining. To provide a tamper proof product, the substrate is first imaged with the desired data with an infrared laser and then coated with an ablatable coating. Any attempt to re-image the substrate or alter the image will ablate the coating and render the reimaged region obvious. The image is indelible in the sense that re-imaging is not possible.

DESCRIPTION

It has been discovered that sufficient treatment of a metal substrate by rotary brush graining produces a surface which can be visibly imaged by selective exposure to infrared laser radiation.

Figure 1A:
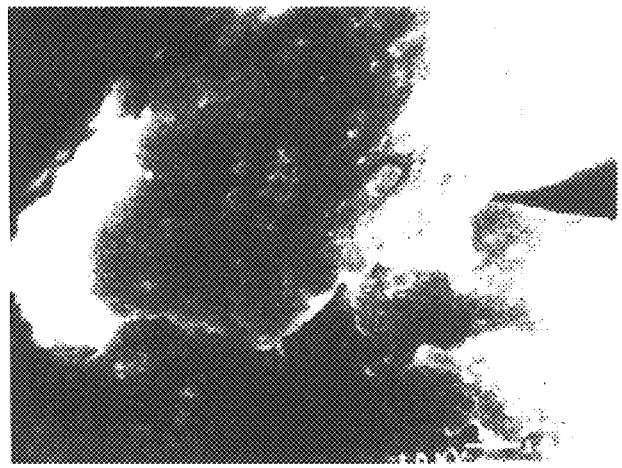
FIGS. 1 A–C are SEMS of surfaces 1P, 2P and 3P at 100,000× magnification.
Figure 1B:
Figure 1C:
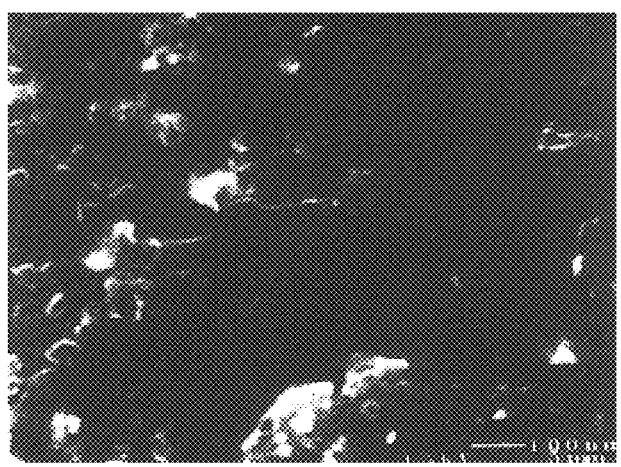

The amount of rotary brush graining required to impart the ability to be imaged by an infrared laser can be determined empirically. For example, three samples were prepared representing different degrees of rotary brush graining. The same brush graining unit and brushes were used for each sample. The brush graining stand contained eight brushes, each 14 inches in diameter. The brush filaments were 2 inch long nylon. The brushes were rotated axially at 750 rpm. The slurry contained 33% unfused platy alumina. An aluminum web was passed through the brush graining unit at a rate of 80 feet per minute. A sample was removed and identified as IP (one pass). The already grained web was passed through the brush graining unit at the same rate of 80 feet per minute a second time. A sample was removed and identified as 2P (two pass). The twice grained aluminum web was again passed through the brush graining unit at the same rate for a third time. A final sample was removed and identified as 3P (three pass). FIGS. 1A–C are SEMs of the 1P, 2P and 3P surfaces at a 100,000× magnification.

All three plate samples were subjected to infrared laser imaging on a Gerber Crescent 42T Plate Image Setter manufactured by Gerber Scientific of South Windsor, Conn. The imaging conditions were the same for each sample. Sample 1P had an image which was barely visible. Sample 2P had move visible image, but the contrast was still rather weak. Sample 3P had a strong vivid image. Although the three samples were found to have similar topographies as characterized by conventional stylus profiling and roughness measurement techniques, the ability to be imaged by the laser is significantly different for the samples.

While not being bound by any particular theory, it appears that extensive embedment of particles during the graining process gives rise to the unique character of the imageable surface. Rotary brush graining results in a surface where multiple particles (e.g., calcined alumina) become embedded within the surface of the sheet, with most being covered over by a skin of the metal as a result of the extensive roughening. The particles have a low thermal conductivity relative to the metal. Thus, hard (relative to the metal substrate) particles with low thermal conductivity, especially hard metal oxide particles, are preferred for use in the present invention. These embedded particles within the metal matrix make for a very circuitous and thus less efficient path for heat dissipation. The energy captured at the surface cannot be transferred efficiently to the substrate via the thin cross sections by which thermal continuity to the bulk of the substrate metal sheet is maintained. This results in a temperature rise at the surface of the grained metal sheet which is sufficient to cause some amount of localized melting of the aluminum within the surface.

While rotary brush graining has been shown to be an efficient method for producing these surfaces, other equivalent methods such as high pressure rolling, grit blasting, ball graining, or the like, which give rise to a metal surface with a relatively high degree of embedded particulate material may also be used.

Not all graining methods are suitable for producing a surface which can be imaged with an infrared laser. For example, graining techniques that do not embed particles such as chemical or electrochemical graining, known to produce suitable lithographic surfaces, do not produce a surface which is imageable by an infrared laser. However, these techniques can be employed for special purposes provided the substrate is subsequently rotary brush grained.

Rotary brush graining typically increases surface roughness. However, the present invention does not require that roughness of the substrate be increased in order to make it laser imageable. For example, it is possible to emboss or electrochemically grain a substrate to produce a coarsely roughened surface, which itself it not laser imageable. Rotary brush graining as described herein will render the substrate laser imageable and may also reduce surface roughness as measured, for example, by a stylus type profiling instrument. Similarly, blasting with very fine particles might reduce the surface roughness of a substrate having a more course initial topography. The present invention requires a treatment which renders the substrate imageable with an infrared laser, but the surface roughness may be increased or decreased as a result of rotary brush graining or equivalent treatment as described herein.

Subsequent to the brush graining process, treatment with harsh chemicals may cause the surface to lose it's ability to be imaged by lasers. For example, etching with sodium hydroxide, as disclosed in U.S. Pat. No. 4,731,317 alters the surface such that it cannot be so imaged. Additionally, excessive anodizing in electrolytes such as sulfuric acid or phosphoric acid can alter the surface so that it is no longer imageable. It is believed that these types of treatments remove the embedded particles and thus alter the efficiency with which the thermal energy is conducted from the surface into the substrate sheet.

It is possible to anodize the brush grained surface and retain the ability to image the surface with infrared lasers at 1064 nm. Anodizing in sulfuric acid at low temperatures with relatively low oxide coating weights is effective in producing a surface which can be laser imaged.

Although aluminum is the preferred substrate, other metals can be rotary brush grained according to the present invention, coated with an ablatable coating, and selectively imaged with an infrared laser such that the coating is ablated in the laser written areas. Suitable metals include zinc, tin, iron, steel and alloys thereof. Laminates of metals might also be used such as tin, zinc, lead and alloys thereof clad or plated onto steel.

In a preferred embodiment, the substrate is prepared on a continuous coil anodizing line. The aluminum web is first subjected to a cleaning or degreasing process to remove milling oil residue from the surface. These processes are well known in the art of preparing aluminum surfaces for subsequent anodization. The aluminum web is rinsed in water after the cleaning step. It is next subjected to a rotary brush graining process using a series of axially rotating brushes that tangentially contact the web in the presence of a slurry comprising unfused platy alumina having a particle size of from 2 to 5 microns up to about 10 microns. As described previously, three passes through an eight brush grainer unit at 80 feet per minute results in a surface which can be laser imaged or can cause an ablatable coating to be ablated from the surface. An equivalent result can be obtained either by a single pass through the eight brush grainer at a throughput speed of approximately 27 feet per minute, or by a single pass through a 24 brush grainer at 80 feet per minute. Although subsequent anodizing is preferred, the as-grained aluminum surface itself is also imageable and can cause a coating thereon to ablate when imaged by an infrared laser. A useful method for graining is as taught in U.S. Pat. No. 4,183,788 to Fromson.

After graining, the aluminum web is rinsed in water and anodized by methods well understood in the art. The electrolyte can be for example sulfuric acid or phosphoric acid. Sulfuric acid is preferred since it allows for oxide formation at lower dissolution rates. The anodizing is further preferentially carried out at relatively lower temperatures to further minimize the redissolution of the anodic oxide coating with the added benefit of producing a harder oxide layer than anodizing processes at higher electrolyte temperatures. Preferred oxide coating weights are in the range of 0.1 to 3.0 milligrams per square inch. More preferred oxide coating weights are in the range of 0.2 to 0.8 milligrams per square inch. U.S. Pat. No. Re 29,754 issued to Fromson discloses a preferred method for anodizing.

Preferred laser imaging systems use infrared YAG lasers operating at powers up to 15 watts. Gerber Scientific of South Windsor, Conn. and Scan Graphics of Wedel., Germany supply commercial systems which can be used to image archival media prepared according to the present invention.

An example of an archival medium prepared according to the present invention is an optical disc, much like a compact disc (CD) that can be grained and anodized on both sides for imaging on both sides. By using a YAG laser spot of 1 or 2 microns, as much as one billion bytes of information can be stored on each side of a 5 inch disc.

In a further embodiment, the archival medium of the invention can be used for signage or illustration purposes. It can also be used as a credit or security card that has no visible account or code information. This is accomplished by coating an imaged substrate with a polymer or like coating that is opaque to visible light so as to obscure account or code information imaged into the substrate as described herein. The coating is transparent to either IR or UV radiation enabling the card to be "read" by an appropriate scanning device. A combination of coatings that are opaque to visible light in one area and transparent in other areas can also be used.

Polymer coatings can be thermoplastic or thermoset and include phenolic and epoxy resins, acrylic polymers, polycarbonates, PVC polymers and the like. The coating can contain a dye or pigment to obscure the imaged surface of the underlying substrate and can be overprinted with information to identify the issuer of the card and the like. By using nonablative polymers that are transparent to infrared laser radiation, archival substrates of the invention can be coated for security and/or protection before laser imaging.

Credit, ATM and security cards can be imaged with analog or digital information before or after applying the obscuring coating. Such a coating can also carry holograms, magnetic strips and the like.

In a further embodiment, an ablatable coating can be applied to an archival medium that has been laser imaged to provide a tamper proof product such as a credit or security card. Such coating can be clear, translucent or opaque. Any attempt to re-image the substrate or alter the image with a laser will also ablate the overlying coating which can readily be detected. A credit card, for example, with portions of the coating removed by ablation would not be accepted by vendors.

Coatings comprising certain phenolic polymers or silicone resins can be used as ablatable security coatings according to the present invention. Other ablatable coatings can be determined empirically.

The ablatable coating can be non-light sensitive, such as phenylmethylsiloxanes, or light sensitive, such as positive active coatings based on phenolic resins. Such positive acting coatings are well known in the art and have been found to readily ablate with an infrared laser when applied to a archival medium of the present invention. Examples of phenolic resins useful in the practice of this invention, such as Novolac or resole resins, are described in Chapter XV of "Synthetic Resins in Coatings," H. P. Preuss, Noyes Development Corporation (1965), Pearl River, N.Y.

The ablatable coating should be as thin as possible but still adequately cover the substrate to provide a security coating. Coating weights in the range of about 50 to about 500 milligrams per square foot can be used, but it is preferable to work in the range of about 100 to 200 milligrams per square foot.

It has been found that a laser imaged substrate cannot be re-imaged because of the alteration of the surface brought about by infrared imaging. The initial image is thus indelible in the sense that any attempt to alter information imaged into the substrate will become readily apparent upon visual examination or by an inability to read the card electronically or optically.

This feature of the invention can be used to advantage by blanket exposing an imaged substrate or by imaging a grid pattern over or around an image in the substrate. Blanket exposure or imaging a grid pattern with an infrared laser will permanently alter the non-information areas of the substrate. It is preferred to leave a border area around the image to provide sufficient contrast to see or read the desired image. Imaging a grid pattern around the desired image is akin to imprinting a watermark in bond paper.

This feature of the invention can be utilized in different ways. The writing of an archival medium can be done such that all of the non-information areas of the medium are exposed to the writing laser beam. The surface is thus altered in these areas, and new information cannot be added to these regions. Alternatively, the non-information areas of the medium can be written so as to have a recognizable pattern. For example:

```
XXXXXXXXXXXXXXXXX
XXXXXXXXXXXXXXXXX
XXXJohn DoeXXXXXXXXX
XXXPresidentXXXXXXXXX
XXXAny CorporationXXXXX
XXXID No. 123456789XXXX
XXXXXXXXXXXXXXXXX
XXXXXXXXXXXXXXXXX
```

No new information can be added in the region where the "X" pattern appears in the non-information areas. The blanket or patterned imaging of the non-information areas would preferentially be done during the information writing process, but could optionally be done following the writing process.

The following examples are illustrative without being limiting.

EXAMPLE 1

Several samples and two comparative samples were prepared from an Alcoa 3103-H26 alloy aluminum coil. The coil was grained and anodized at varying conditions set forth in the following table. All samples except for T-30 are anodized in 25% sulfuric acid. T-30 was anodized in a 2% tartaric acid solution.

TABLE 1

| Sample | Graining | Anodizing | Volts | Amp/sq.in | Oxide Wt. mg/sq.in |
|---|---|---|---|---|---|
| EX-140 | 3.5 sec. | 50 sec. | 40 | 1.05 | 2.8 |
| EX-147 | 3.5 sec. | 50 sec. | 15 | .17 | .51 |
| EX-148 | 3.5 sec. | 25 sec. | 14 | .19 | .29 |
| T-30 | 3.5 sec. | 30 sec. | 50 | .07 | .275 |
| EX-113 | 2.3 sec. | 31 sec. | 29 | .71 | 1.27 |
| Delta | 1.5 sec. | 20 sec. | 36 | .91 | 1.29 |

All samples were placed in a Gerber 42T Plate Image Setter and exposed image wise with the YAG laser at 9, 7 and 5 watts. After exposure a permanent visible image was created in samples EX 140, 147, 148 and T-30 at all power levels.

Samples EX-113 and Delta are comparative examples which have been etched in sodium hydroxide solution and desmutted in nitric acid solution prior to anodization. The etching destroys the ability of these samples to be imaged.

EXAMPLE 2

To demonstrate the archival nature of the image, imaged samples EX-140 and EX-147 were subjected to three different conditions:

1. Heat: samples were placed in an oven at 260° C. for 4 hours.
2. Water: samples were immersed in water at ambient temperatures for 100 hours.
3. Actinic exposure: the samples were exposed for one hour on a Theimer Copymat 64-CP exposure unit having 2500 watt MuHi spectrum bulb. Total exposure exceeded 16,000 mj/cm2.

TABLE 2

| Test Conditions | Color Values | Ex-140 Image Area | EX-140 Non-Image Area | EX-147 Image Area | EX-147 Non-Image Area |
|---|---|---|---|---|---|
| Control | L | 39.26 | 35.99 | 48.62 | 44.19 |
| | a | −.13 | −.06 | −.68 | −.79 |
| Ambient Air | b | −.10 | −.13 | −.67 | −.64 |
| Heat | L | 40.01 | 36.73 | 49.47 | 45.54 |
| | a | −.17 | −.11 | −.63 | −.75 |
| | b | −.23 | −.01 | −.62 | −.68 |
| Ambient Water | L | 39.07 | 36.03 | 48.84 | 44.84 |
| | a | −.17 | −.05 | −.65 | −.75 |
| | b | −.18 | −.08 | 0.66 | −.65 |
| Actinic exposure | L | 39.32 | 36.02 | 48.59 | 44.67 |
| | a | −.11 | −.07 | −.69 | −.81 |
| | b | −.11 | −.13 | −.88 | −.88 |

The color value properties of the imaged and non-imaged areas of each plate were measured on a Hunter Labs Colorquest Spectrophotomer. The data, in the form of L, a and b values for each section, are reported in Table 2.

The data in Table 2 shows that the three test conditions did not significantly alter the contrast of the surface for either EX-140 or EX-147. In all cases the image/non-image differential was maintained.

EXAMPLE 3

Two brush grained and anodized aluminum substrates (EX-140 and EX-147 from Table 1) were placed in the Gerber 42T Plate Image Setter and exposed image wise with the YAG laser at 9, 7 and 5 watts. After exposure a permanent visible image was left on the brushed grained anodized aluminum surface. The change caused by the YAG laser produced enough contrast so that a visible image could be detected down to 5 watts.

EXAMPLE 4

Mechanically roughened samples were prepared for each of the following planar metal sheet types:

Terne (Pb/Sn alloy) coated stainless steel

Galvanized steel

Tin plated steel

Zinc

For each sample graining was accomplished by a single pass through a series of eight cylindrical nylon brushes rotating at 750 RPM. The speed through the grained was 12 feet/minute. The graining medium was unfused aluminum oxide (calcined alumina).

The roughened sheets were then imaged on a Gerber Crescent 42T Thermal Plate Imager. All samples showed evidence of a visible image at a low contrast as a result of the selective writing by the laser.

EXAMPLE 5

The following positive-acting, light sensitive security coating formulation is prepared:

| | |
|---|---|
| Arcosolve PM | 42.86% |
| Ethanol | 21.34% |
| 1,1-Napthoquinone diazide [2]-5-sulfonyloxy P-cresol resin | 9.26% |
| Cresol resin | 20.70% |
| t-Butylphenolformaldehyde resin | 0.36% |
| Phenolformaldehyde resin | 4.76% |
| Blue dye | 0.76% |
| BYK 344 | 0.08% |

Archival medium EX-147, (Table 1) is imaged with credit card data on a Gerber Crescent 42T Setter laser at a power of 6.5 watts. The above coating is then applied to the imaged archival medium at a dry coating weight of 140 mg/sq ft. The coating is ablated when reimaging is attempted and is readily detected.

EXAMPLE 6

An example of an archival sheet which has been previously imaged.
Substrate EX-147 from Table 1 was used. One half of the substrate was blanket-imaged on a Gerber Crescent 42T Imager. The laser imaged side visually appeared much lighter than the other. The sheet was subsequently coated with the light sensitive security coating of Example 5 at a dry coating weight of 140 mg/sq. ft. The coated sheet was then selectively imaged with a Gerber Crescent 42T Imager at 200 Hz. 7.9 watts such that the selective pattern overlapped both the lighter and darker sides of the substrate. On the darker side the coating ablated in the laser imaged areas, anodized substrate had a clearly distinguishable visible image. On the light side of the substrate which had been subjected to the blanket imaging prior to coating, the coating did not ablate, and the visible image in the aluminum substrate had an extremely weak contrast indicting that the blanket imaged substrate cannot be imaged.

What is claimed is:

1. Method for preparing an archival medium comprising
   a) graining the surface of an aluminum substrate with particulate material under conditions that embed particulate material into said surface; and
   b) without intermediate treatment which can remove said embedded particulate material, directly imaging the grained substrate from step (a) with an infrared laser to form visible information areas in the substrate by localized melting of aluminum within said surface.

2. Method of claim 1 wherein said grained substrate is rotary brush grained.

3. Method of claim 1 wherein said grained substrate is anodized before laser imaging.

4. Method for preparing an archival medium comprising
   a) graining the surface of a metal substrate with particulate material under conditions that embed particulate material into said surface; and
   b) without intermediate treatment which can remove said embedded particulate material, directly imaging the grained substrate from step (a) with an infrared laser to form visible information areas in the substrate by localized melting of metal within said surface.

5. Method of claim 4 wherein the metal substrate is selected from the group consisting of tin, zinc, lead or steel coated with zinc, tin or lead, and alloys thereof.

6. Method of claim 4 wherein the substrate is rotary brush grained.

7. Method of preparing a tamper-proof archival medium comprising coating the imaged substrate made by the method of claims 1, 3 or 4 with a coating transparent to infrared laser radiation that is ablated therefrom where the substrate is struck by infrared radiation.

8. Method of claim 7 wherein said coating is selectively ablated in areas other than said information areas.

9. Method of claim 7 wherein said coating is selectively ablated in said information areas.

10. Method of claim 7 wherein said coating is clear, or opaque to visible radiation.

11. Method of claim 7, wherein said coating is translucent to visible radiation.

12. Method of preparing a tamper-proof archival medium comprising coating the grained substrate from step (a) of the method of claims 1, 3 or 4 prior to imaging with a nonablative coating that is transparent to infrared laser radiation.

13. Method of claim 12 wherein said coating is clear, or opaque to visible radiation.

14. Method of claim 12, wherein said coating is translucent to visible radiation.

15. Archival medium comprising a grained aluminum substrate having particulate material embedded in the surface thereof, that, without intermediate treatment which can remove said embedded particulate material, has information areas formed in said surface by localized melting of aluminum within said information areas by direct imaging with an infrared laser.

16. Archival medium of claim 15 wherein said grained substrate is anodized before said information areas are formed without removing said embedded particulate material.

17. Archival medium of claim 15 having a coating that is opaque to visible light but transparent to infrared or ultraviolet radiation.

18. Archival medium of claim 15 having a coating which is transparent to visible light.

19. Archival medium of claim 15 having a combination of coatings opaque and transparent to visible light.

20. Archival medium of claim 15 having a coating transparent to infrared laser radiation that is ablated from the substrate where struck by infrared laser radiation.

21. Archival medium comprising a grained metal substrate having particulate material embedded in the surface thereof, that, without intermediate treatment which can remove said embedded particulate material, has information areas formed in said surface by localized melting of metal within said information areas by direct imaging with an infrared laser.

22. Archival medium of claim 21 wherein the metal substrate is selected from the group consisting of tin, zinc, lead or steel coated with zinc, tin or lead, and alloys thereof.

* * * * *